United States Patent [19]
Yanagawa

[11] Patent Number: 5,253,240
[45] Date of Patent: Oct. 12, 1993

[54] TRACKING ERROR DETECTING SYSTEM FOR REMOVING AN OFFSET IN AN OPTICAL DISK PLAYER

[75] Inventor: Naoharu Yanagawa, Saitama, Japan

[73] Assignee: Pioneer Electronic Corporation, Tokyo, Japan

[21] Appl. No.: 689,580

[22] Filed: Apr. 23, 1991

[30] Foreign Application Priority Data

Nov. 29, 1990 [JP] Japan ................................ 2-332125

[51] Int. Cl.⁵ .............................................. G11B 7/095
[52] U.S. Cl. .............................. 369/44.32; 369/44.36; 369/44.42; 369/54
[58] Field of Search ............... 369/44.23, 44.29, 44.32, 369/44.35, 44.36, 44.41, 44.42, 54; 250/201.1, 201.5, 202

[56] References Cited

U.S. PATENT DOCUMENTS

| | | | |
|---|---|---|---|
| 4,654,838 | 3/1987 | Suguki | 369/44.42 |
| 4,695,158 | 9/1987 | Kotaka et al. | 369/44.23 X |
| 4,815,060 | 3/1989 | Nomura | 369/44.23 |

Primary Examiner—W. R. Young
Attorney, Agent, or Firm—Nikaido, Marmelstein, Murray & Oram

[57] ABSTRACT

A photodetector is divided into a pair of first segments and a pair of second segments by a common line. A total area of the first segments is larger than an area of a spot reflected from an optical disk onto the first segments. The second segments are provided within the first segments. A total area of the second segments is smaller than the spot. A detecting circuit is provided for producing a tracking error signal by removing a difference between outputs of the first segments and a difference between outputs of the second segments.

3 Claims, 6 Drawing Sheets

TRACKING ERROR DETECTING SYSTEM FOR REMOVING AN OFFSET IN AN OPTICAL DISK PLAYER

FIELD OF THE INVENTION

The present invention relates to an optical pick-up system for an optical disk player, and more particularly to a system for detecting a tracking error signal.

BACKGROUND OF THE INVENTION

The essential function of the optical pick-up system is to detect an audio signal recorded on the disk and produce an electric signal corresponding to the recorded information. The system generates a control signal for producing the signal. Further, the system has an optical system for detecting a focus error signal and a tracking error signal.

FIGS. 9a and 9b show a beam for detecting a tracking error signal using a push-pull method. A laser light from a laser diode (not shown) is focused onto a disk 1 through an objective 2 and a reflected light 3 is focused on a photo detector 4. The reflected light 3 includes an image detecting light and a tracking error detecting light. In a conventional system, the photodetector 4 for detecting tracking error signal is divided into two detectors PD1 and PD2. Therefore the reflected light from the disk 1 is divided into two parts on the photodetectors PD1 and PD2, respectively, for comparing the intensities of the divided light with each other. If there is no error in tracking, the intensities of the divided light are the same. Thus, the spots of beams on the photodetectors PD1 and PD2 are symmetrical about the optical axis between the photodetectors as indicated by a dashed line of FIG. 9b.

On the other hand, the optical axis XI of the tracking error detecting light 3a and the optical axis XII of the image detecting light 3b may deflect by a difference $\alpha$ because of the movement of a tracking actuator (not shown). Consequently, the illuminated spot 3A on the photodetector PD1 is different from the spot 3B on the photodetector PD1 in area. As a result, an offset is included in the tracking error signal.

More particularly, if the output powers of the photodetectors PD1 and PD2 are $3A_0$ and $3B_0$ when no offset occur, the tracking error signal TE is $$TE = 3A_0 - 3B_0 = 0$$

If the offset quantity is $\alpha$, and the output powers are $3A_1$ and $3B_1$ when an offset occurs, the tracking error signal TE is $$TE = 3A_1 - 3B_1 = (3B_0 + \alpha) - (3A_0 - \alpha) = 2\alpha$$

Accordingly, the pickup is moved by a power corresponding to the tracking error $2\alpha$ so that the tracking error may become zero. Namely, the pickup malfunctions because there is no tracking error.

Further, when the disk 1 is tilted relative to the beam as the disk rotates as shown is FIG. 9c, an offset also occurs in the tracking error signal.

In order to reduce the offset in the tracking error signal, the diameter of the spot on the photodetector is reduced so as to be smaller than the diameter of the reflected beam for preventing the influence of the offset. By this system, about half of the tracking error signal is suppressed.

However, in this system, since a small part of the reflected light is used as the effective signal, S/N ratios of both of the tracking error signal and an RF signal reduce. The reduction of the S/N ratio deteriorates characteristic of signals such as the servo signal and RF signal to be reproduced.

SUMMARY OF THE INVENTION

The object of the present invention is to provide a tracking error detecting system which may improve the accuracy of the signal to be reproduced.

According to the present invention, there is provided a tracking error detecting system for an optical disk player comprising, a photodetector comprising a pair of first segments a total area of which is larger than an area of a spot reflected from the optical disk onto the first segments, a pair of second segments provided within the first segments and a total area of the second segments being smaller than the spot, and a detecting circuit for producing a tracking error signal by removing a difference between outputs of the first segments and a difference between outputs of the second segments.

In an aspect of the invention, the first and second segments are divided by a common line. The detecting circuit includes circuit means for removing a difference between a difference based on all outputs of the first and second segments and a difference based on outputs of the second segments.

Other objects and features of this invention will become understood from the following description with reference to the accompanying drawings.

DETAILED DESCRIPTION OF THE PREFERRED EMBODIMENTS

Figure 1:
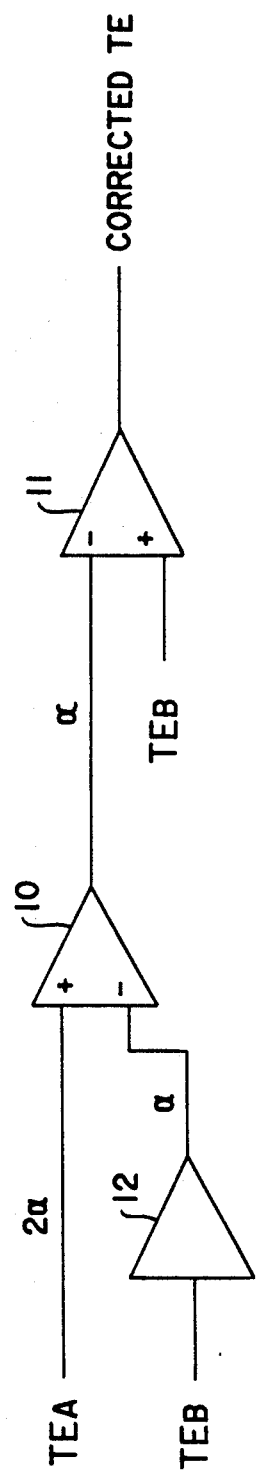
FIG. 1 shows a tracking error detecting circuit for detecting a tracking error signal according to the present invention.

Referring to FIG. 1, a tracking error detecting system of the present invention has two operational amplifiers 10 and 11.

Figures 2A, 2B:
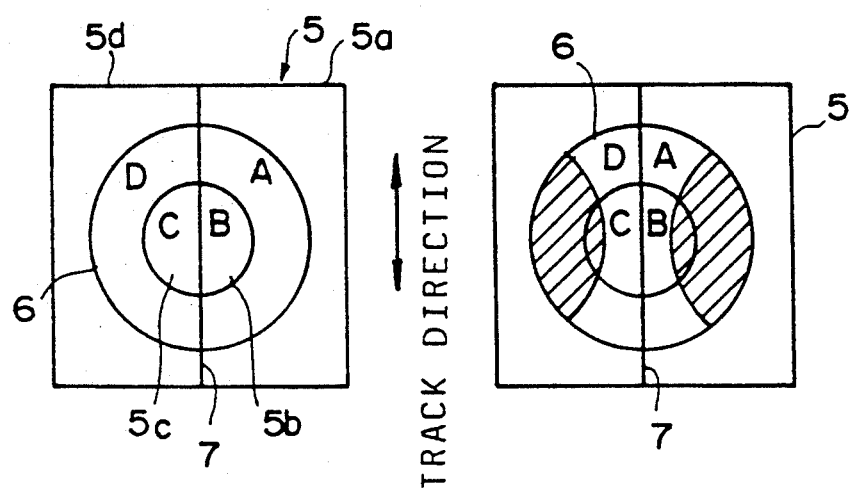
FIGS. 2a and 2b are schematic plan views showing a photodetector of the system.
Figure 3:
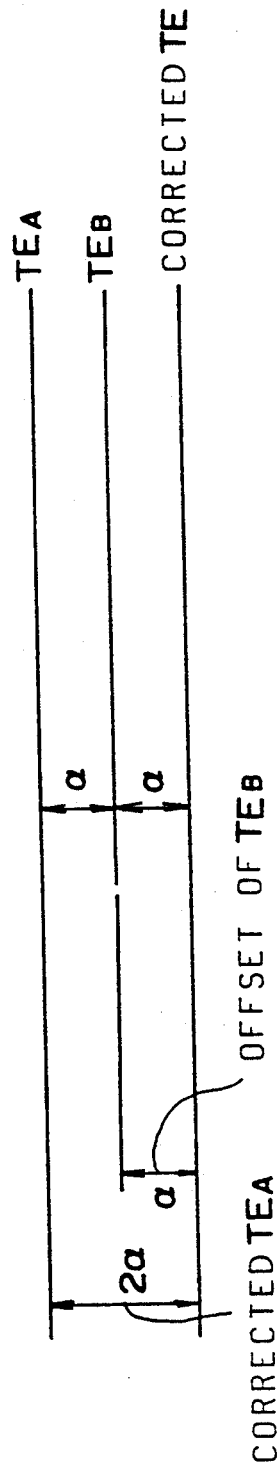
FIG. 3 is a schematic illustration explanatorily showing the operation of the circuit of FIG. 1.

Referring to FIGS. 2a and 2b showing a photodetector 5, a surface of the photodetector 5 for receiving a reflected light is laterally divided into four sections 5a, 5b, 5c and 5d about the optical axis by a common line 7. When the beam is reflected on the photodetector 5, a spot 6 of the beam is formed on the surface of the photodetector 5. Each of the sections 5a and 5d has an area larger than a semicircular spot B (C). The photodetector 5 is so arranged that the larger section 5a (5d) produces an output about two times the output of the semicircular spot B (C), in accordance with the semiannular spot A (D). The photodetector 5 detects a tracking error signal in a tracking direction indicated by an arrow. In FIG. 2b, the hatched portions in the spot 6 represent spots of diffraction lights generated on the optical disk based on the laser light.

A total tracking error signal $TE_A$ is represented as follows.

$$TE_A = (A_0 + B_0) - (C_0 + D_0) = 0$$

where $A_0$ to $D_0$ are outputs of segments 5a to 5d at the spots A to D when no offset occur.

A partical tracking error $TE_B$ detected by the segments 5b and 5c is $$TE_B = B_0 - C_0 = 0$$

Assume that the offset is by $\alpha$ to the right in FIG. 2a, the outputs $A_1$ to $D_1$ under the offset $\alpha$ are as follows.

$$A_1 + B_1 = (A_0 + B_0) + \alpha$$

$$C_1 + D_1 = (C_0 + D_0) - \alpha$$

$$B_1 = B_0 + \tfrac{1}{2}\alpha$$

$$C_1 = C_0 - \tfrac{1}{2}\alpha$$

$$\begin{aligned} TE_A &= (A_1 + B_1) - (C_1 + D_1) \\ &= (A_0 + B_0) - (C_0 + D_0) + 2\alpha \\ &= 2\alpha \\ TE_B &= B_1 - C_1 = (B_0 - C_0) + \alpha \\ &= \alpha \end{aligned}$$

The tracking error signal $TE_A$ is applied to a noninverting terminal of the operational amplifier 10. The tracking error signal $TE_B$ is applied to an inverting terminal of the amplifier 10 through an amplifier 12. The amplifier 12 is provided for increasing the amplitude of the signal $TE_B$ to that of the signal $TE_A$. An output of the amplifier 10 is applied to an inverting terminal of the operational amplifier 11. A noninverting terminal of the amplifier 11 is applied with the tracking error signal $TE_B$.

An output TE of the amplifier 11 is as follows.

$$\begin{aligned} TE &= TE_B - (TE_A - TE_B) \\ &= 2TE_B - TE_A \\ &= 2\alpha - 2\alpha = 0 \end{aligned}$$

Namely, a correct tracking error signal TE is produced from the amplifier, removing the offset $\alpha$. Therefore, an accurate tracking is performed by using the output signal TE.

Figure 4:
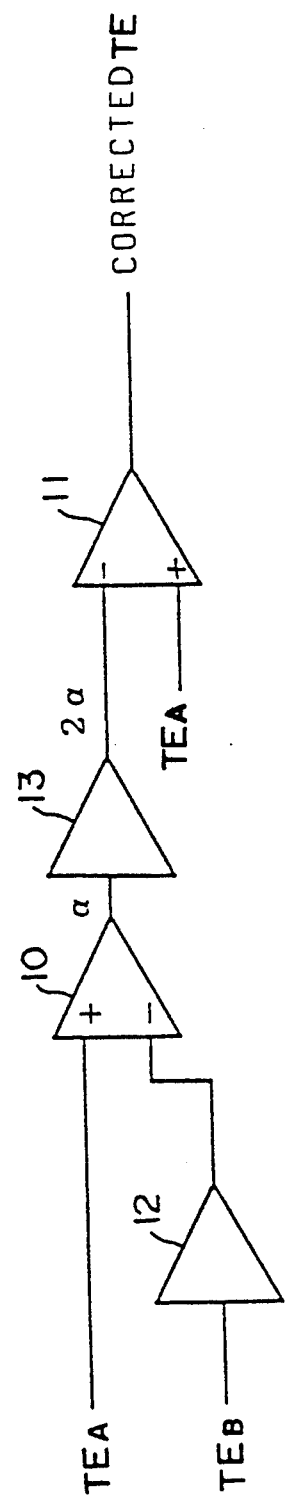
FIG. 4 shows a circuit of a second embodiment of the present invention.

FIG. 4 shows the second embodiment of the invention. An amplifier 13 is provided between the operational amplifiers 10 and 11 to double the offset $\alpha$. In the second embodiment, the tracking error signal $TE_A$ is applied to the noninverting terminal of the amplifier 11. Other structures are the same as the first embodiment and the same parts thereof are identified with the same reference numerals as FIG. 1.

The difference $\alpha$ between the offsets of the signals $TE_A$ and $TE_B$ obtained in the amplifier 10 is applied to the amplifier 13 wherein the difference $\alpha$ is doubled. An output $2\alpha$ of the amplifier 13 is applied to the inverting terminal of the amplifier 11. The difference $2\alpha$ is subtracted from the offset $2\alpha$ of the signal $TE_A$. Thus, the corrected tracking error signal TE is produced by the amplifier 11.

Figure 5:
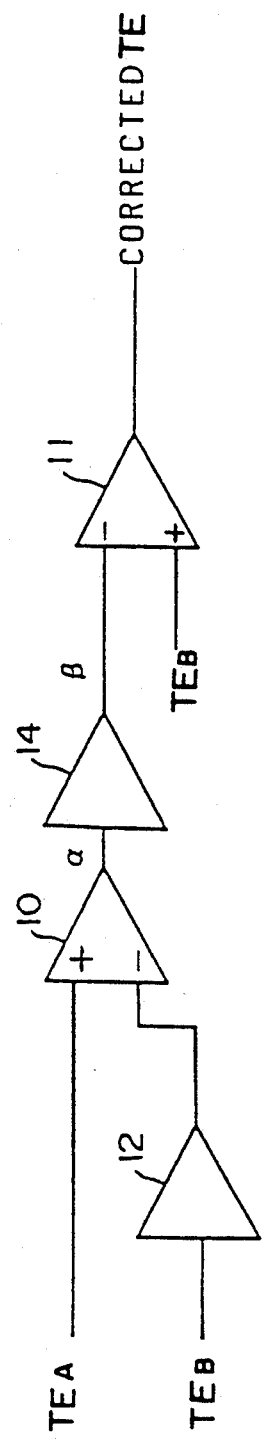
FIG. 5 shows a circuit of a third embodiment.
Figure 6:
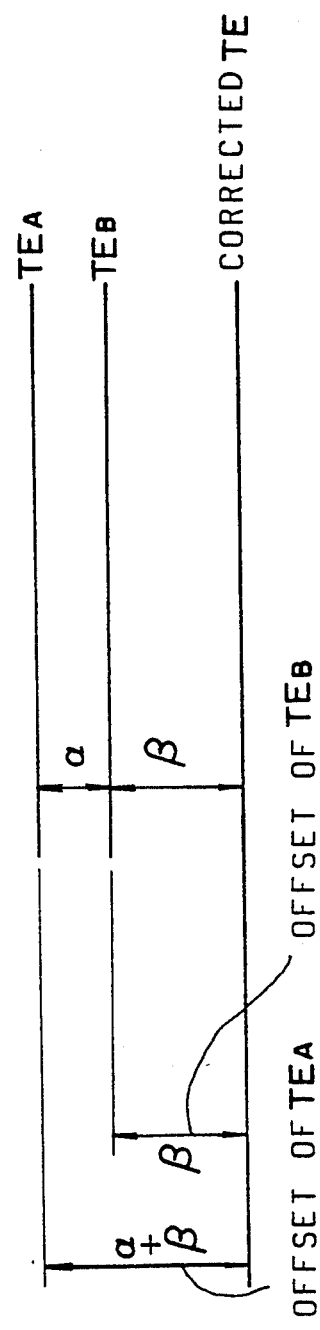
FIG. 6 is a schematic illustration showing the operation of the third embodiment.

FIGS. 5 and 6 show the third embodiment. As shown in FIG. 5, an amplifier 14 is provided between the operational amplifier 10 and 11. The noninverting terminal of the amplifier 11 is applied with the tracking error signal $TE_B$.

As shown in FIG. 6, the offset $\beta$ included in the tracking error signal $TE_B$ is different from the difference $\alpha$ between the tracking error signals $TE_A$ and $TE_B$. Thus, the offset of the signal $TE_A$ becomes $\alpha + \beta$. The amplifier 14 is provided for multiplying the difference of the offset between the signals $TE_A$ and $TE_B$ by $\beta/\alpha$.

The tracking error signal $TE_A$ having the offset $\alpha + \beta$ is applied to the noninverting terminal of the amplifier 10 and the tracking error signal $TE_B$ having the offset $\beta$ is applied to the inverting terminal thereof. The offset $\beta$ of the signal $TE_B$ is subtracted from the offset $\alpha + \beta$ of the signal $TE_A$ to obtain the difference $\alpha$. The difference $\alpha$ is applied to the amplifier 14 in which the difference $\alpha$ is multiplied by $\beta/\alpha$ so that a difference $\beta$ is obtained. The difference $\beta$ is applied to the inverting terminal of the amplifier 11. The difference $\beta$ is subtracted from the offset $\beta$ of the signal $TE_B$. Thus, the corrected tracking error signal TE is obtained.

Figure 7:
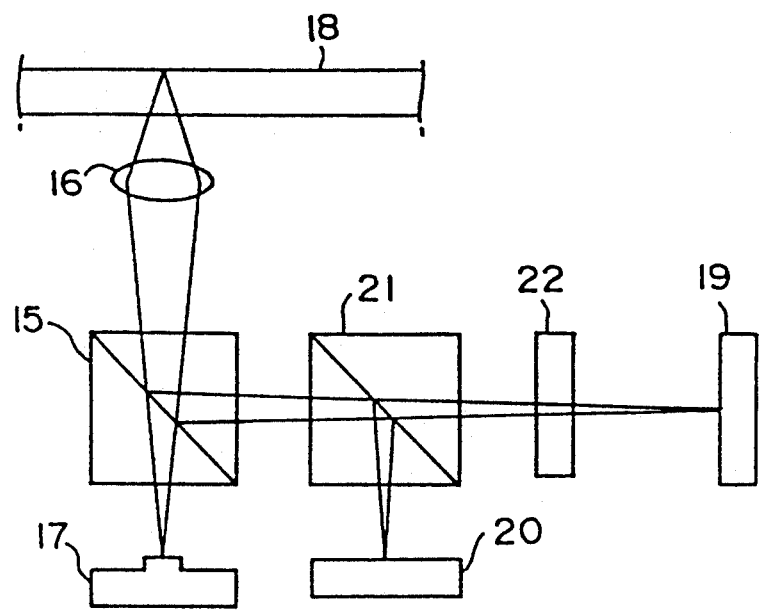
FIG. 7 is a schematic diagram showing a fourth embodiment.

FIG. 7 shows the fourth embodiment. An optical pick-up system of the fourth embodiment comprises a laser diode 17 for emitting a laser light through a beam splitter 15. The light is focus onto a disk 18 through an objective 16. The reflected beam from the disk 18 is fed to a focus error detector 1 through a beam splitter 21 and an astigmatism generating element 22 and to a tracking error detector 20 through the beam splitter 21.

In the fourth embodiment, the focus error detector 19 generates the tracking error signal $TE_A$ as well as a focus error signal.

Figure 8A:
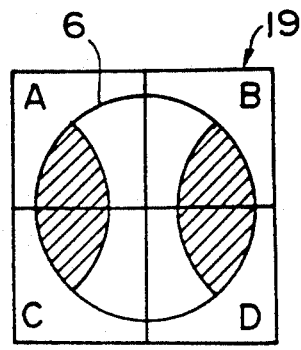
FIG. 8a is a plan view showing a focus error detector of the fourth embodiment.

FIG. 8a shows a photodetector as the focus error detector 19. The photodetector is split into four sections A, B, C and D.

A focus error signal FE is obtained by an equation as follows.

$$FE = (A+D) - (B+C)$$

The tracking error signal $TE_A$ is obtained as follows.

$$TE_A = (A+C) - (B+D)$$

Figure 8B:
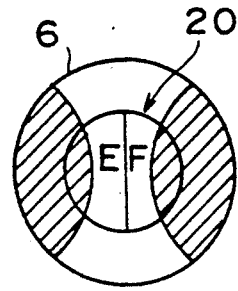
FIG. 8b is a plan view showing spots on a tracking error detector of the fourth embodiment.
Figure 9A:
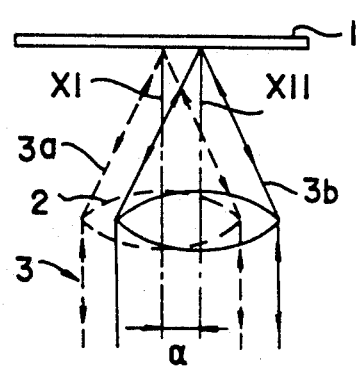
FIGS. 9a to 9d are illustrations for explaining an offset included in a tracking error signal in a conventional tracking error detecting system.
Figure 9C:
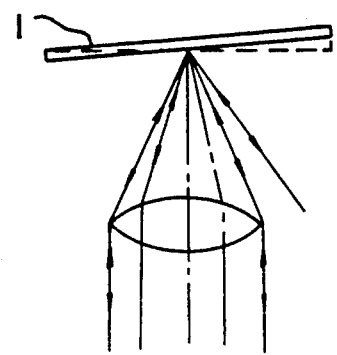
Figure 9B:
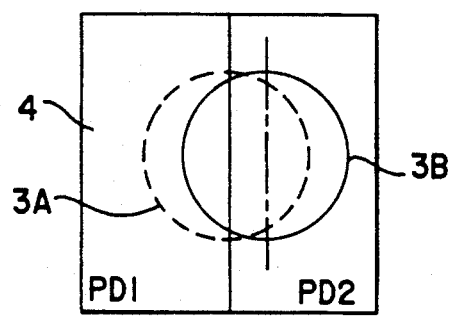
Figure 9D:
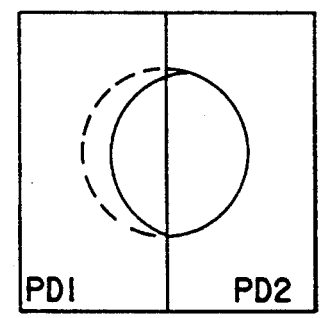

FIG. 8b shows a photodetector as the tracking error detector 20. The photodetector is split into two sections E and F. The tracking error signal $TE_B$ is obtained as follows.

$$TE_B = E - F$$

In the embodiment, the photodetector for detecting the tracking error signal is simplified.

In accordance with the present invention, a photodetector detects all of the reflected light to obtain a tracking error signal. The offset included in the tracking error signal is removed by the detecting circuit. Thus, the S/N ratio of the signal is prevented from reducing, thereby improving the characteristic of the signal to be reproduced.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A tracking error detecting system for an optical disk player comprising:

a first photodetector including a pair of first segments for producing first outputs, a total area of the first segments being larger than an area of a spot reflected from an optical disk onto said first segments;

a second photodetector comprising a pair of second segments for producing second outputs, a total area of said second segments being smaller than said spot;

an offset detecting circuit for detecting an offset from said first outputs of said first photodetector and said second outputs of said second photodetector; and a tracking error detecting circuit for producing a tracking error signal a) from one of said first outputs and second outputs and b) from the detected offset, by removing the detected offset.

2. The system according to claim 1 wherein said second segments are provided within said first segments, and said first and second segments are divided by a common line.

3. The system according to claim 1 wherein the offset detecting circuit includes circuit means for producing a difference between a difference based on all outputs of said first and second segments and a difference based on outputs of said second segments.

* * * * *